US012803774B2

(12) United States Patent
Maki

(10) Patent No.: US 12,803,774 B2
(45) Date of Patent: Nov. 17, 2026

(54) TIME SYNCHRONIZATION SYSTEM

(71) Applicant: SEIKO EPSON CORPORATION, Tokyo (JP)

(72) Inventor: Yoshiyuki Maki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 9 days.

(21) Appl. No.: 18/938,444

(22) Filed: Nov. 6, 2024

(65) Prior Publication Data

US 2025/0150251 A1 May 8, 2025

(30) Foreign Application Priority Data

Nov. 6, 2023 (JP) ................................ 2023-189108

(51) Int. Cl.
*H04L 7/00* (2006.01)

(52) U.S. Cl.
CPC .......... *H04L 7/0008* (2013.01); *H04L 7/0016* (2013.01); *H04L 7/0095* (2013.01)

(58) Field of Classification Search
CPC .... H04L 7/0016; H04L 7/0095; H04L 7/0008
See application file for complete search history.

(56) References Cited

U.S. PATENT DOCUMENTS 6,104,915 A * 8/2000 Zhang ...................... H03L 7/08 455/260
2003/0095008 A1* 5/2003 Kranz ...................... H03L 7/00 331/18
2021/0112512 A1* 4/2021 Dickie .................. H04J 3/0638
2023/0023487 A1* 1/2023 Fischer ................. G01S 19/215
2023/0077120 A1* 3/2023 Takahashi ............. H04J 3/0697
2023/0319746 A1* 10/2023 Hara ................. H04W 56/0015 370/350

FOREIGN PATENT DOCUMENTS

JP 2022014406 A 1/2022

* cited by examiner

*Primary Examiner* — Syed Haider
(74) *Attorney, Agent, or Firm* — CHIP LAW GROUP

(57) ABSTRACT

The time synchronization system 1 includes a plurality of synchronization sources 100 each of which outputs time information, and a calculator 200 that executes a predetermined process to each time information that is output from the plurality of synchronization sources 100, wherein each of the plurality of synchronization sources 100 has an oscillator 30 and a detector 40 that outputs variation information of the oscillator 30 and the calculator 200 changes the predetermined process to be executed on the time information based on the variation information output from the detector 40 of each of the plurality of synchronization sources 100.

4 Claims, 3 Drawing Sheets

TIME SYNCHRONIZATION SYSTEM

The present application is based on, and claims priority from JP Application Serial Number 2023-189108, filed Nov. 6, 2023, the disclosure of which is hereby incorporated by reference herein in its entirety.

BACKGROUND

1. Technical Field

The present disclosure relates to a time synchronization system.

2. Related Art

In the related art, there has been known a time synchronization system having a plurality of synchronization sources, each of which has an oscillator and outputs time information, and a calculator that executes a predetermined process on each set of time information output from the plurality of synchronization sources that are connected on a network. For example, JP-A-2022-14406 discloses a time synchronization network in which a plurality of communication devices having synchronization sources such as crystal oscillators and atomic clocks are connected, and time information is corrected by executing an offset process on time difference information between the communication devices.

However, the oscillators of the synchronization sources have a limited life span and degrade over time. In the time synchronization network disclosed in JP-A-2022-14406, the time information is corrected by executing the offset process. However, when the oscillators degrade over time, the frequency stability deteriorates, and the correction accuracy decreases. As described above, when considering the overall time synchronization system 1, the time synchronization system of the related art might have deterioration in frequency stability due to degradation of the oscillator over time, even if statistical processing is executed.

SUMMARY

A time synchronization system in the present disclosure for solving the above problems includes a plurality of synchronization sources each of which outputs time information and a calculator that executes a predetermined process on each set of time information that is output from the plurality of synchronization sources; wherein each of the plurality of synchronization sources has an oscillator and a detector that outputs variation information of the oscillator and the calculator changes the predetermined process to be executed on the time information based on the variation information that is output from the detector of each of the plurality of synchronization sources.

DESCRIPTION OF EMBODIMENTS

Figure 1:
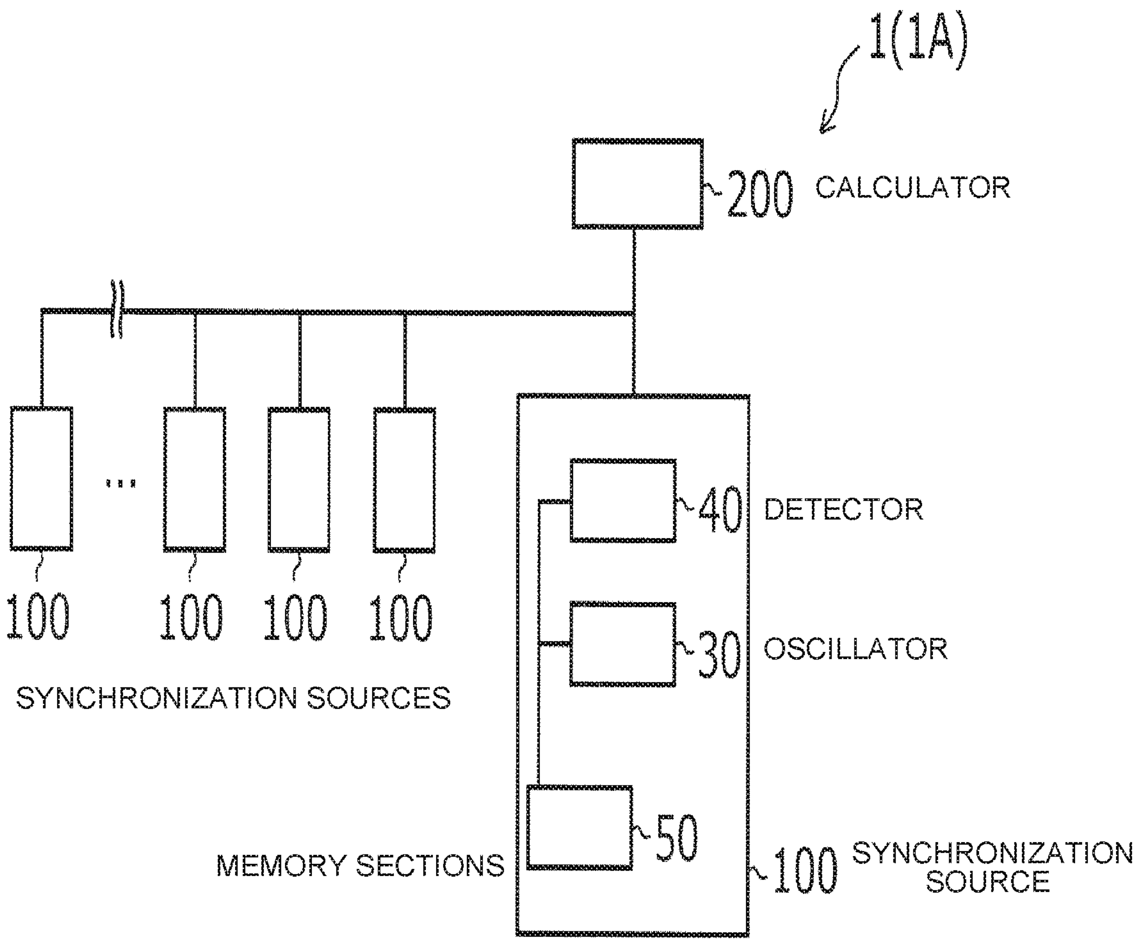
FIG. 1 is a diagram showing a time synchronization system in a first embodiment of the present disclosure.

First, a brief description of the present disclosure is described. A first aspect of a time synchronization system according to the present disclosure for solving the above problem includes a plurality of synchronization sources each of which outputs time information and a calculator that executes a predetermined process on each set of time information that is output from the plurality of synchronization sources; wherein each of the plurality of synchronization sources has an oscillator and a detector that outputs variation information of the oscillator and the calculator changes the predetermined process to be executed on the time information based on the variation information that is output from the detector of each of the plurality of synchronization sources.

According to this aspect, a plurality of synchronization sources and a calculator are provided, each of the synchronization sources is provided with an oscillator and a detector that outputs variation information of the oscillators, and the calculator changes a predetermined process to be executed on the time information based on the variation information output from the detector of each of the synchronization sources. In other words, it is possible to detect degradation of the oscillator over time by providing the detector that outputs the variation information of the oscillator. By this, when degradation of the oscillator over time is detected, the predetermined process can be changed based on this information. Therefore, it is possible to suppress deterioration in frequency stability when considering the entire time synchronization system.

A second aspect of the time synchronization system in the present disclosure is an aspect according to the first aspect, wherein the variation information includes at least one of information relating to a strength variation of a resonance signal of the oscillator and information relating to an environmental variation around the synchronization source.

According to this aspect, the variation information includes at least one of information relating to a strength variation of a resonance signal of the oscillator and information relating to an environmental variation around the synchronization source. The strength variation of the resonance signal of the oscillator and the environmental variation around the oscillator lead to deterioration of the frequency stability, but by changing the predetermined process to be executed on the time information based on information relating to these variations, it is possible to suppress deterioration of the frequency stability when considering the entire time synchronization system.

A third aspect of the time synchronization system in the present disclosure is an aspect according to the first or second aspect, wherein the predetermined process is statistical processing on the time information that is output from each of the plurality of synchronization sources.

According to this aspect, the predetermined process is a statistical processing on the time information output from each of the plurality of synchronization sources. Therefore, the statistical processing for the time information that is output from each synchronization source can be executed with high accuracy.

A fourth aspect of the time synchronization system in the present disclosure is an aspect according to the third aspect, wherein based on the variation information, the calculator changes a weighting in the statistical processing on the time information that is output from a corresponding synchronization source.

According to this aspect, the calculator, based on the variation information, changes a weighting in the statistical processing on the time information that is output from a corresponding synchronization source. The weighting of time information with high reliability is set to be large and the weighting of time information with low reliability is set to be small. By this, it is possible to desirably execute the predetermined process.

A fifth aspect of the time synchronization system in the present disclosure is an aspect according to the first or second aspect, wherein the oscillator is an atomic oscillator.

According to this aspect, the oscillator is an atomic oscillator that is capable of outputting a clock signal with high frequency accuracy using atomic energy transition. Therefore, in the time synchronization system including the atomic oscillator that requires high accuracy as an oscillator, it is possible to suppress deterioration in frequency stability when considering the entire time synchronization system.

First Embodiment

Hereinafter, a time synchronization system 1 according to an embodiment of the present disclosure will be described with reference to the accompanying drawings. First, a time synchronization system 1A according to a first embodiment of the present disclosure will be described with reference to FIGS. 1 and 2. FIG. 1 is a diagram showing a time synchronization system 1A in the present embodiment. As shown in FIG. 1, the time synchronization system 1A according to the present embodiment is the time synchronization system 1 that has a plurality of synchronization sources 100 each of which has an oscillator 30 and which outputs time information; a calculator 200 that executes an ensemble statistical processing as a predetermined process on each time information that is output from the plurality of synchronization sources 100 that are connected on a wired or wireless network; and memory sections 50 that store various information.

As shown in FIG. 1, each of the plurality of synchronization sources 100 has an oscillator 30, and a detector 40 that outputs variation information of the oscillator 30. The calculator 200 can change the predetermined process to be executed on the time information based on the variation information that is output from the detector 40 of each of the plurality of synchronization sources 100. In other words, the time synchronization system 1A in the present embodiment can detect degradation of the oscillators 30 over time by providing the detector 40, which outputs the variation information of the oscillator 30. By this, in a case where degradation of the oscillator 30 is detected over time, it is possible to change the predetermined process based on the information. Therefore, it is possible to suppress deterioration in frequency stability when considering the entire time synchronization system 1.

Here, in the time synchronization system 1A in this embodiment, as described above, the oscillator 30 is an atomic oscillator. Therefore, in the time synchronization system 1A having an atomic oscillator, which requires high accuracy, as the oscillator 30, the time synchronization system 1A in this embodiment can suppress deterioration in frequency stability when considering the entire time synchronization system 1.

Figure 2:
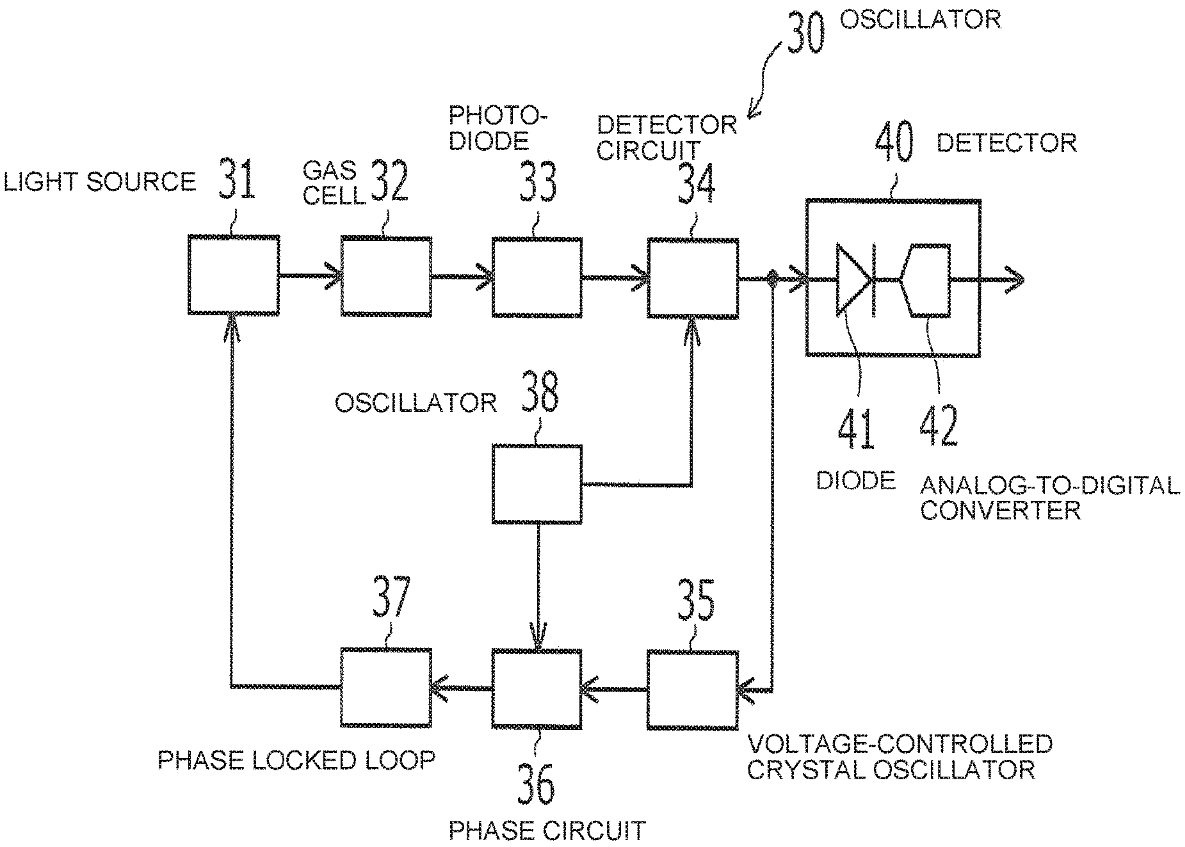
FIG. 2 is a diagram showing a circuit block for capturing a resonance signal strength in an oscillator of a synchronization source of the time synchronization system in FIG. 1.

Hereinafter, the oscillator 30 and the detector 40 will be described in more detail with reference to FIG. 2. The oscillator 30 in the present embodiment is an atomic oscillator that is capable of outputting a high frequency accuracy clock signal utilizing atomic energy transition. FIG. 2 is a block diagram illustrating an electrical configuration of the oscillator 30 and the detector 40, and is a diagram illustrating a circuit block that captures a resonance signal strength in the oscillator 30 of the synchronization source 100 of the time synchronization system 1A in the present embodiment.

As shown in FIG. 2, the oscillator 30 has a light source 31, which is a light emitting section that emits light, a gas cell 32, and a photodiode 33, which is a light receiving section. Note that the light source 31 or the gas cell 32 has a limited life span, and may degrade over time. If the light source 31 or the gas cell 32 degrades over time, the frequency stability is likely to deteriorate.

The oscillator 30 has a detector circuit 34 as a sweep result output section that outputs a sweep result signal corresponding to a resonance signal obtained by frequency sweep in the oscillator 30. It also has a crystal oscillator (voltage-controlled crystal oscillator: VCXO) 35 as a voltage-controlled oscillator (VCO), a phase circuit 36, a PLL (Phase Locked Loop) 37, and an oscillator 38.

A semiconductor laser or the like can be used as the light source 31, for example. For example, an alkali metal such as rubidium, cesium, or sodium in gaseous form is enclosed in the gas cell 32. The photodiode 33 receives light emitted from the light source 31 and transmitted through the gas cell 32, changes photoelectrically and outputs it as an electric signal.

The crystal oscillator 35 is not particularly limited, and for example, an oven-controlled crystal oscillator (OCXO), a temperature compensated crystal oscillator (TCXO), or the like can be used. The detector circuit 34 has a function of outputting a sweep result signal corresponding to the resonance signal (EIT signal) obtained by the frequency sweep in the oscillator 30.

Hereinafter, the sweep result signal generated by the oscillator 30 will be further described. Hereinafter, for ease of understanding, as an example, the frequency and the like of each signal will be described using specific numerical values. First, it is assumed that gaseous rubidium is enclosed in the gas cell 32, that atomic resonance of the gaseous rubidium occurs at a frequency $\omega_0$ of 9.2 GHZ, and that the oscillator 38 outputs a signal of 111 Hz.

A signal with a frequency of f is output from the crystal oscillator 35. This signal is modulated in the phase circuit 36 at a frequency of 111 Hz. It is then multiplied in the PLL 37 by $4.1\times10^7$ times, that is, to a frequency of 4.6 GHZ, and is output toward the light source 31. In this way, when the frequency sweep is executed with a signal whose frequency is 111 Hz, atomic resonance, that is, an electromagnetically induced transparency (EIT) phenomenon, occurs in the gas cell 32 at a predetermined timing, and an atomic resonance signal (EIT signal), which is a steep signal generated with the EIT phenomenon, is generated.

When atomic resonance does not occur, a signal with the frequency of 111 Hz is input from the photodiode 33 to the detector circuit 34. However, when atomic resonance occurs, a signal with the frequency of 111 Hz is not input from the photodiode 33 to the detector circuit 34, but a signal with a frequency of 222 Hz, that is, a two times wave signal with respect to 111 Hz, is input to the detector circuit 34. The signal with the frequency of 222 Hz when this atomic resonance occurs is the sweep result signal. The sweep result signal is output from the detector circuit 34 to the detector 40, which is a two times wave level detector.

The detector 40 has a diode 41 and an analog-to-digital converter 42. The detector 40 receives an analog value from the oscillator 30, converts it to a digital value, and outputs it to the calculator 200.

The detector circuit 34 controls amplitude of the signal with the frequency of 111 Hz being input from the photodiode 33 to the detector circuit 34 so that the amplitude of the signal with the frequency of 111 Hz becomes 0. In other words, the detector circuit 34 executes a control so that the signal with the frequency of 111 Hz is no longer input from the photodiode 33 to the detector circuit 34.

Here, an example of the two times wave level detection process will be described. The two times wave level detection process described below is executed by the calculator 200. First, in each of the synchronization sources 100, one day (24 hours) after the synchronization sources 100 are turned on, digital detection values output from the analog-to-digital converters 42 are stored in the memory sections 50. Next, the digital detection value output from the analog-to-digital converter 42 is obtained for every one day and compared with the digital detection value stored in the memory section 50 to calculate an amount of variation between them. The calculator 200 then executes a statistical processing on the times of the plurality of synchronization sources 100 based on magnitude of the amount of variation.

As described above, the variation information of the oscillator 30 in the present embodiment of the time synchronization system 1A is information relating to strength variation of the resonance signal of the oscillator 30. It is desirable that the variation s information relating to the strength variation of the resonance signal of the oscillator 30. The strength variation of the resonance signal of the oscillator 30 leads to deterioration in frequency stability. However, by changing the predetermined process (the ensemble statistical processing based on the two times wave level detection process) executed on the time information on the basis of the information relating to the strength variation of the resonance signal of the oscillator 30, it is possible to suppress deterioration in frequency stability when considering the entire time synchronization system 1.

As described above, the predetermined process (ensemble statistical processing based on the two times wave level detection processing) in the time synchronization system 1A of the present embodiment is a statistical processing on the time information that is output t from each of the plurality of synchronization sources 100. Therefore, the time synchronization system 1A in the present embodiment can execute the statistical processing on the time information output from each synchronization source 100 with high accuracy.

Here, in the predetermined process (ensemble statistical processing based on the two times wave level detection process), the calculator 200 changes weighting in the statistical processing of the time information that is output from the corresponding synchronization source 100 based on the variation information of the oscillator 30. Specifically, weighting of highly reliable time information will be increased and weighting of less reliable time information will be decreased. By executing such processes, it is possible to suitably execute the predetermined process.

An example of weighting in the statistical processing of time information will be described below. In the present embodiment of the time synchronization system 1A, the amount of variation when comparing with the digital detection values stored in the memory sections 50 is regarded as an amount of the resonance signal variation. A statistical processing mode is then executed in which the weighting of its synchronization sources 100 was changed based on the amount of the resonance signal variation. Table 1 below summarizes a relationship between an amount of the resonance signal variation, a weighting of the synchronization sources 100, and the statistical processing mode. However, the present disclosure relates to the weighting of the synchronization sources 100 based on the amount of the resonance signal variation, and is not limited to the weighting described below.

TABLE 1

| AMOUNT OF RESONACE VARIATION | STATISTICAL PROCESSING MODE | WEIGHTING OF SYNCHRONIZATION SOURCE (0-1) |
|---|---|---|
| 1%≤, <5% | mode 1 | 0.8 |
| 5%≤, <10% | mode 2 | 0.6 |
| 10%≤, <20% | mode 3 | 0.4 |
| 20%≤ | mode 4 | 0 |

As shown in Table 1, the time synchronization system 1A in the present embodiment is set to mode 1, in which the weighting of the synchronization sources 100 is 0.8 when the amount of the resonance signal variation is 1% or more and less than 5%. Although omitted in Table 1, when the amount of the resonance signal variation is less than 1%, mode 0 is set in which the weighting of the synchronization sources 100 is set to 1. Similarly, the time synchronization system 1A in the present embodiment is set to mode 2 in which the weighting of the synchronization sources 100 is 0.6 when the amount of the resonance signal variation is 5% or more and less than 108, and is set to mode 3 in which the weighting of the synchronization sources 100 is 0.4 when the amount of the resonance signal variation is 10% or more and less than 20%. When the amount of the resonance signal variation is 20% or more, the time synchronization system 1A in the present embodiment determines that the amount of the resonance signal variation is too large, and sets the weighting to 0, that is, sets mode 4 in which the information of the synchronization sources 100 is not used.

Second Embodiment

Figure 3:
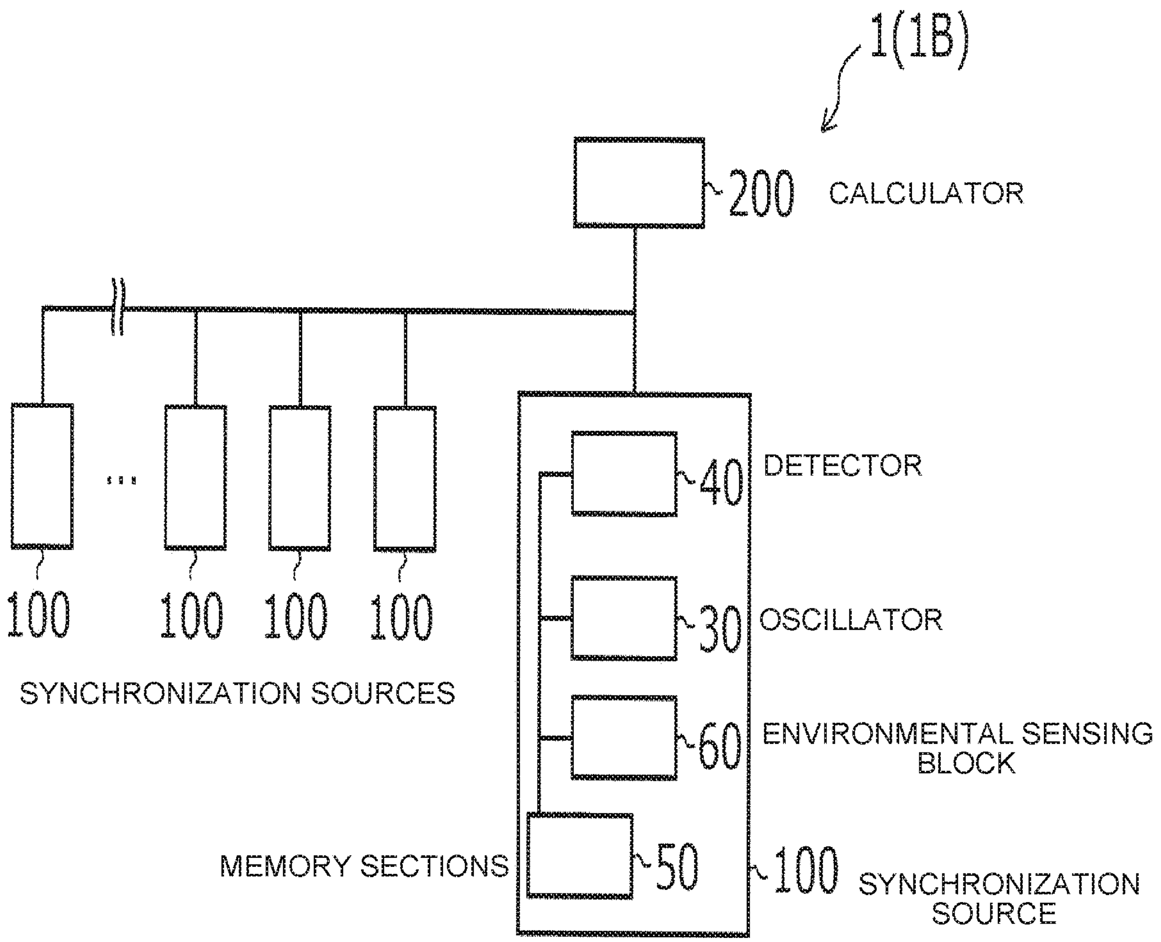
FIG. 3 is a diagram showing a time synchronization system in a second embodiment of the present disclosure.

Next, a time synchronization system 1B in the second embodiment will be described with reference to FIG. 3. Note that FIG. 3 is a diagram corresponding to FIG. 1 in the time synchronization system 1A of the first embodiment. In FIG. 3, components that are common to the first embodiment are denoted by the same reference numerals, and a detailed description thereof will be omitted. The time synchronization system 1B in the present embodiment has the same configuration as the time synchronization system 1A in the first embodiment except for the portions described below. Therefore, the time synchronization system 1B in the present embodiment has the same features as those of the time synchronization system 1A in the first embodiment except for the portions described below.

As shown in FIG. 3, the synchronization sources 100 of the time synchronization system 1B in the present embodiment are further provided with an environmental sensing block 60 as compared with the synchronization sources 100 of the time synchronization system 1A in the first embodiment. Therefore, in addition to ensemble statistical processing based on the amount of the resonance signal variation that can be executed by the time synchronization system 1A in the first embodiment, the ensemble statistical processing can be executed based on a detection information detected by the environmental sensing block 60. The environmental sensing block 60 of the time synchronization system 1B in the present embodiment is configured to be capable of detecting an environment around the synchronization sources 100. Specifically, it is configured to be capable of detecting temperature of the region where the synchronization sources 100 are located, vibration of the region where the synchronization sources 100 are located, magnetic field of the region where the synchronization sources 100 are located, and radiation of the region where the synchronization sources 100 are located, and the like.

Since the calculator 40 of the time synchronization system 1B in the present embodiment can change the predetermined process to be executed on the time information based on the variation information output from the detector 40 of each of the plurality of synchronization sources 100, the calculator 40 can change the predetermined process to be executed on the time information based on the information relating environmental variation around the synchronization sources 100 as the variation information. Therefore, by changing the predetermined process (ensemble statistical processing) to be executed on the time information based on the information relating to environmental variation around the synchronization sources 100, the time synchronization system 1B in the present embodiment can suppress deterioration of the frequency stability when considering the entire time synchronization system 1.

The time synchronization system 1B in the present embodiment can change the weighting in the statistical processing of the time information that is output from each of the plurality of synchronization sources 100 based on the information relating to the environmental variation around the synchronization sources 100. An example of weighting in the statistical processing of time information will be described below. The time synchronization system 1B in the present embodiment executes the statistical processing mode in which the weighting of the synchronization sources 100 are changed based on an amount of the environmental variation including an amount of the temperature variation from a reference value (temperature one day before), an amount of the vibration variation from a reference value (0 G), an amount of the magnetic field variation from a reference value (0 Gauss), and an amount of the radiation variation from a reference value (0 rad), which are the detection results of the environmental sensing block 60.

Tables 2 to 5 below summarize a relationship between the amount of the environmental variation, the weighting of the synchronization sources 100, and the statistical processing mode. Specifically, Table 3 below summarizes a relationship between the amount of 41 the temperature variation, the weighting of the synchronization sources 100, and the statistical processing mode, Table 4 below summarizes a relationship between the amount of the vibration variation, the weighting of the synchronization sources 100, and the statistical processing mode, Table 5 below summarizes a relationship between the amount of the magnetic field variation, the weighting of the synchronization sources 100, and the statistical processing mode, and Table 5 below summarizes a relationship between the amount of the radiation variation, the weighting of the synchronization sources 100, and the statistical processing mode. However, the present disclosure is not limited to the following weighting with respect to the weighting of the synchronization sources 100 based on the amount of the environmental variation.

TABLE 2

| AMOUNT OF TEMPERATURE VARIATION | STATISTICAL PROCESSING MODE | WEIGHTING OF SYNCHRONIZATION SOURCE (0-1) |
|---|---|---|
| 20° C.≤, <40° C. | mode 1 | 0.8 |
| 40° C.≤, <60° C. | mode 2 | 0.6 |
| 60° C.≤, <80° C. | mode 3 | 0.4 |
| 80° C.≤ | mode 4 | 0 |

As shown in Table 2, the time synchronization system 1B in this embodiment is set to mode 1 in which the weighting of the synchronization sources 100 are 0.8 when the amount of the temperature variation is 20° C. or more and less than 40° C. Note that although omitted in Table 2, when the amount of the temperature variation is less than 20° C., the weighting of the synchronization sources 100 is set to 1, that is, mode 0. Similarly, the time synchronization system 1B in the present embodiment sets mode 2 in which the weighting of the synchronization sources 100 is 0.6 when the amount of the temperature variation is 40° C. or more and less than 60° C., and sets mode 3 in which the weighting of the synchronization sources 100 is 0.4 when the amount of the temperature variation is 60° C. or more and less than 80° C. On the other hand, when the amount of the temperature variation is 80° C. or more, the time synchronization system 1B in the present embodiment determines that the amount of the temperature variation is too large, and sets the weighting to 0, that is, sets mode 4 in which the information of the synchronization sources 100 is not used.

TABLE 3

| AMOUNT OF VIBRATION VARIATION | STATISTICAL PROCESSING MODE | WEIGHTING OF SYNCHRONIZATION SOURCE (0-1) |
|---|---|---|
| 0.001 G≤, <0.01 G | mode 1 | 0.8 |
| 0.01 G≤, <0.1 G | mode 2 | 0.6 |
| 0.1 G≤, <1 G | mode 3 | 0.4 |
| 1 G≤ | mode 4 | 0 |

As shown in Table 3, the time synchronization system 1B in the present embodiment sets mode 1 in which the weighting of the synchronization sources 100 is 0.8 when the amount of the vibration variation is 0.001 G or more and less than 0.01 G (1 G=9.8 $m/s^2$). Note that although omitted in Table 3, when the amount of the vibration variation is less than 0.001 G, the weighting of the synchronization sources 100 is set to 1, that is, mode 0. Similarly, the time synchronization system 1B in the present embodiment sets mode 2 in which the weighting of the synchronization sources 100 is 0.6 when the amount of the vibration variation is 0.01 G or more and less than 0.1 G, and sets mode 3 in which the weighting of the synchronization sources 100 is 0.4 when the amount of the vibration variation is 0.1 G or more and less than 1 G. On the other hand, the time synchronization system 1B in the present embodiment determines that the amount of the vibration variation is too large when the amount of the vibration variation is 1 G or more, and sets the weighting to 0, that is, sets mode 4 in which the information of the synchronization sources 100 is not used.

TABLE 4

| AMOUNT OF MAGNETIC FIELD VARIATION | STATISTICAL PROCESSING MODE | WEIGHTING OF SYNCHRONIZATION SOURCE (0-1) |
|---|---|---|
| 0.01 Gauss≤, <0.1 Gauss | mode 1 | 0.8 |
| 0.1 Gauss≤, <1 Gauss | mode 2 | 0.6 |
| 1 Gauss≤, <10 Gauss | mode 3 | 0.4 |
| 10 Gauss≤ | mode 4 | 0 |

As shown in Table 4, the time synchronization system 1B in this embodiment is set to mode 1 in which the weighting of the synchronization sources 100 is 0.8 when the amount of the magnetic field variation is 0.01 Gauss or more and less than 0.1 Gauss. Note that although omitted in Table 4, when the amount of the magnetic field variation is less than 0.01 Gauss the weighting of the synchronization sources 100 is set to 1, that is, mode 0. Similarly, the time synchronization system 1B in the present embodiment sets mode 2 in which the weighting of the synchronization sources 100 is set to 0.6 when the amount of the magnetic field variation is 0.1 Gauss or more and less than 1 Gauss, and sets mode 3 in which the weighting of the synchronization sources 100 is set to 0.4 when the amount of the magnetic field variation is 1 Gauss or more and less than 10 Gauss. On the other hand, the time synchronization system 1B in the present embodiment determines that the amount of the magnetic field variation is too large when the amount of the magnetic field variation is 10 Gauss or more, and sets the weighting to 0, that is, mode 4 in which the information of the synchronization sources 100 is not used.

TABLE 5

| AMOUNT OF RADIATION VARIATION | STATISTICAL PROCESSING MODE | WEIGHTING OF SYNCHRONIZATION SOURCE (0-1) |
|---|---|---|
| 10 rad≤, <100 rad | mode 1 | 0.8 |
| 100 rad≤, <1000 rad | mode 2 | 0.6 |
| 1000 rad≤, <10000 rad | mode 3 | 0.4 |
| 10000 rad≤ | mode 4 | 0 |

As shown in Table 5, the time synchronization system 1B in the present embodiment sets mode 1 in which the weighting of the synchronization sources 100 is set to 0.8 when the amount of the radiation variation is 10 rad or more and less than 100 rad (100 rad=1 Gy). Note that although omitted in table 5, when the amount of the radiation variation is less than 10 rad the weighting of the synchronization sources 100 is set to 1, that is, mode 0. Similarly, the time synchronization system 1B in the present embodiment sets mode 2 in which the weighting of the synchronization sources 100 is set to 0.6 when the amount of the radiation variation is 100 rad or more and less than 1000 rad, and sets the mode 3 in which the weighting of the synchronization sources 100 is set to 0.4 when the amount of the radiation variation is 1000 rad or more and less than 10000 rad. On the other hand, the time synchronization system 1B in this embodiment determines that the amount of the vibration variation is too large when the amount of the radiation variation is 10000 rad or more, and sets the weighting to 0, that is, mode 4 in which the information of the synchronization sources 100 is not used.

The present disclosure is not limited to the above-described embodiments, and can be realized by various configurations without departing from the scope of the disclosure. The technical features in the embodiments corresponding to the technical features in each aspect described in the summary of the disclosure can be appropriately replaced or combined in order to solve a part or all of the problems described above or in order to achieve a part or all of the effects described above. If the technical features are not described as essential in this specification, the technical features can be appropriately deleted.

What is claimed is:

1. A time synchronization system comprising:

a plurality of synchronization sources each of which outputs time information; and a calculator that executes a predetermined process on the time information that is output from the plurality of synchronization sources, wherein each of the plurality of synchronization sources has an oscillator, and a detector that outputs variation information of the oscillator, the variation information includes at least one of information relating to a strength variation of a resonance signal of the oscillator, and information relating to an environmental variation around a synchronization source of the plurality of synchronization sources, and the calculator changes the predetermined process to be executed on the time information based on the variation information that is output from the detector of each of the plurality of synchronization sources.

2. The time synchronization system according to claim 1, wherein the predetermined process is statistical processing on the time information that is output from each of the plurality of synchronization sources.

3. The time synchronization system according to claim 2, wherein based on the variation information, the calculator changes a weighting in the statistical processing on the time information that is output from a corresponding synchronization source of the plurality of synchronization sources.

4. The time synchronization system according to claim 1, wherein the oscillator is an atomic oscillator.

* * * * *